United States Patent
Brouwer et al.

(10) Patent No.: US 9,069,359 B2
(45) Date of Patent: Jun. 30, 2015

(54) PRESSURE BALANCE UNIT

(71) Applicant: Kohler Co., Kohler, WI (US)

(72) Inventors: Douglas J. Brouwer, Sheboygan, WI (US); Michael A. Niver, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 149 days.

(21) Appl. No.: 13/802,149

(22) Filed: Mar. 13, 2013

(65) Prior Publication Data

US 2014/0261751 A1 Sep. 18, 2014

(51) Int. Cl.
*G05D 11/00* (2006.01)
*G05D 7/06* (2006.01)

(52) U.S. Cl.
CPC ......... *G05D 7/0676* (2013.01); *Y10T 137/2521* (2015.04)

(58) Field of Classification Search
CPC .................................................. G05D 23/1313
USPC ..................................................... 137/98, 100
See application file for complete search history.

(56) References Cited

U.S. PATENT DOCUMENTS

| | | | |
|---|---|---|---|
| 2,145,114 A * | 1/1939 | Gibbs et al. | 137/100 |
| 2,983,279 A | 5/1961 | Biermann | |
| RE25,037 E | 9/1961 | Brazier | |
| 3,688,790 A | 9/1972 | Esten | |
| 3,724,480 A | 4/1973 | Povalski et al. | |
| 3,770,017 A | 11/1973 | Enterante | |
| 3,794,075 A | 2/1974 | Stoll et al. | |
| 3,823,737 A | 7/1974 | Szymanski | |
| 3,946,756 A | 3/1976 | Specht | |
| 4,095,610 A | 6/1978 | Priesmeyer | |
| 4,121,761 A | 10/1978 | Nolden | |
| 4,174,726 A | 11/1979 | Arnold et al. | |
| 4,220,175 A | 9/1980 | Keller et al. | |
| 4,381,073 A | 4/1983 | Gloor | |
| 4,397,330 A | 8/1983 | Hayman | |
| 4,516,753 A * | 5/1985 | Thomsen | 251/346 |
| 4,609,007 A | 9/1986 | Uhl | |
| 4,662,389 A | 5/1987 | Igbal | |

(Continued)

FOREIGN PATENT DOCUMENTS

WO WO-2010/069606 6/2010

OTHER PUBLICATIONS

Delta, MultiChoice Installation Instructions, 2011, 6 pages.

(Continued)

*Primary Examiner* — Kevin Murphy
*Assistant Examiner* — R. K. Arundale
(74) *Attorney, Agent, or Firm* — Foley & Lardner LLP

(57) ABSTRACT

A pressure balance unit for a valve assembly includes a first shell having a tongue extending therefrom, a second shell having a groove indented therein, and a sliding element having a shaft defining an axis. The groove in the second shell is configured to receive the tongue from the first shell for aligning the shells. The first and second shells are united using a sonic welding process. The first shell defines a first bore and the second shell defines a second bore. The first and second bores include inlet ports in circumferential faces thereof, the ports defining openings transverse to the axis. The sliding element includes a first end movable along the axis within the first bore and a second end movable along the axis within the second bore. The ends of the sliding element open and close the inlet ports by sliding across the ports.

19 Claims, 9 Drawing Sheets

(56) References Cited

U.S. PATENT DOCUMENTS

| | | | |
|---|---|---|---|
| 4,681,140 A | 7/1987 | Hayman | |
| 4,896,381 A | 1/1990 | Hutto | |
| 4,905,732 A | 3/1990 | Bright et al. | |
| 4,915,295 A | 4/1990 | Pullen et al. | |
| 4,923,092 A * | 5/1990 | Kirschner et al. | 222/129.4 |
| 4,978,059 A | 12/1990 | Nicklas et al. | |
| 5,129,576 A | 7/1992 | Pullen et al. | |
| 5,137,048 A | 8/1992 | Brattoli | |
| 5,170,816 A | 12/1992 | Schnieders | |
| 5,331,996 A | 7/1994 | Ziehm | |
| 5,340,018 A | 8/1994 | MacDonald | |
| 5,355,906 A | 10/1994 | Marty et al. | |
| 5,425,394 A | 6/1995 | Clare | |
| 5,433,378 A | 7/1995 | Orlandi | |
| 5,441,075 A | 8/1995 | Clare | |
| 5,501,244 A | 3/1996 | Shahriar | |
| 5,505,225 A | 4/1996 | Niakan | |
| 5,518,019 A | 5/1996 | Clare | |
| 5,518,022 A | 5/1996 | Ziehm | |
| 5,634,391 A | 6/1997 | Eady | |
| 5,725,010 A | 3/1998 | Marty et al. | |
| 5,730,171 A * | 3/1998 | Niakan | 137/98 |
| 5,732,729 A * | 3/1998 | Shieh | 137/100 |
| 5,807,983 A | 9/1998 | Jiang et al. | |
| 5,829,469 A | 11/1998 | Sileno et al. | |
| 5,893,386 A | 4/1999 | Caria et al. | |
| 6,012,476 A * | 1/2000 | Ko | 137/98 |
| 6,050,285 A | 4/2000 | Goncze et al. | |
| 6,052,929 A | 4/2000 | Canadas | |
| 6,123,094 A | 9/2000 | Breda | |
| 6,161,567 A | 12/2000 | Ziehm | |
| 6,237,622 B1 | 5/2001 | Cook et al. | |
| 6,279,604 B1 | 8/2001 | Korb et al. | |
| 6,283,447 B1 | 9/2001 | Fleet | |
| 6,302,131 B1 | 10/2001 | Pitsch | |
| 6,343,619 B1 | 2/2002 | Pruitt | |
| 6,357,476 B1 | 3/2002 | Moretti | |
| 6,378,911 B1 | 4/2002 | Grohe | |
| 6,382,517 B1 | 5/2002 | Bommelaer et al. | |
| 6,427,713 B1 | 8/2002 | Dempsey et al. | |
| 6,484,949 B2 | 11/2002 | Procter | |
| 6,546,948 B2 | 4/2003 | Tarzia | |
| 6,561,548 B1 | 5/2003 | Mantel et al. | |
| 6,718,569 B2 | 4/2004 | Burger et al. | |
| 6,732,754 B2 | 5/2004 | Ottelli | |
| 6,761,184 B1 | 7/2004 | Jordan | |
| 6,832,396 B1 | 12/2004 | Lin | |
| 6,845,785 B1 | 1/2005 | Condon | |
| 6,877,523 B2 | 4/2005 | Dempsey et al. | |
| 6,880,565 B2 | 4/2005 | Ouyoung | |
| 7,021,337 B2 | 4/2006 | Markham | |
| 7,063,098 B2 | 6/2006 | Sprague | |
| 7,073,725 B2 | 7/2006 | Swadling | |
| 7,077,150 B2 | 7/2006 | McNerney | |
| RE39,257 E | 9/2006 | Kamimura et al. | |
| 7,100,630 B2 | 9/2006 | Vu et al. | |
| 7,163,157 B2 | 1/2007 | Goncze et al. | |
| 7,337,804 B2 | 3/2008 | Rosko | |
| 7,344,088 B2 | 3/2008 | Yang | |
| 7,509,971 B2 | 3/2009 | Kajuch | |
| D621,479 S | 8/2010 | McNerney | |
| 7,775,234 B2 | 8/2010 | Campisi | |
| 7,775,450 B2 | 8/2010 | Warshawsky | |
| 7,823,603 B2 | 11/2010 | Cochart et al. | |
| 7,841,362 B2 | 11/2010 | Kim | |
| 7,874,318 B2 | 1/2011 | Malone et al. | |
| 8,162,001 B2 | 4/2012 | Yang | |
| 8,176,934 B2 | 5/2012 | Niver | |
| 8,408,239 B2 | 4/2013 | King | |
| 2003/0213850 A1 | 11/2003 | Mayer et al. | |
| 2004/0094214 A1 | 5/2004 | Ottelli | |
| 2004/0261864 A1 | 12/2004 | Coll | |
| 2005/0067017 A1 | 3/2005 | Condon et al. | |
| 2006/0231140 A1 | 10/2006 | McNerney | |
| 2008/0029156 A1 * | 2/2008 | Rosal et al. | 137/2 |
| 2008/0053528 A1 | 3/2008 | Breda | |
| 2009/0260696 A1 | 10/2009 | Cruickshank et al. | |
| 2010/0006169 A1 | 1/2010 | Bolgar et al. | |
| 2010/0058534 A1 | 3/2010 | Martin et al. | |
| 2011/0265890 A1 | 11/2011 | Killian | |
| 2011/0266355 A1 | 11/2011 | Yang | |
| 2012/0279595 A1 | 11/2012 | Huck et al. | |

OTHER PUBLICATIONS

Hansgrohe, iBox Universal Plus, Planning and Installation, Mar. 2011, 26 pages.

Aquatite Wetwall Caddy Installation Instructions, 2005, 2 pages.

* cited by examiner

PRESSURE BALANCE UNIT

BACKGROUND

The present invention relates to a valve assembly for a fluid control device. Particularly, the present invention relates to a pressure balance unit for the valve assembly.

Valve assemblies are used in a variety of plumbing fixtures for controlling the temperature and volume of water dispensed from the fixture. A valve assembly may receive hot water and cold water from separate supply lines and controllably mix the water to provide an output having an intermediate temperature. Temperature control may be accomplished by restricting the volumetric flow rate of either the hot water or the cold water into a mixing chamber within the valve assembly. Typical valve assemblies control volumetric flow rate by increasing or decreasing a cross-sectional area through which either the hot water or the cold water may flow. A user-operable handle, dial, or other mechanism may be used to increase or decrease a cross-sectional area of a flow path within the valve assembly.

Another factor affecting volumetric flow rate is water pressure. The water pressure in the supply lines correlates with a velocity of the water through the valve. Contemporary valve assemblies may include a pressure balance unit for balancing the water pressure of the hot and cold water supply. A pressure balance unit may be used to ensure that differences in water pressure between the hot water supply and cold water supply do not affect the temperature of the mixed output. For example, without a pressure balance unit, if the water pressure in the cold water supply line were to suddenly drop (e.g., a toilet is flushed elsewhere within the plumbing system), the volumetric flow rate of cold water through the valve assembly would decrease, thereby increasing the temperature of the mixed output and potentially providing unexpected hot water to a user (e.g., in the shower). A pressure balance unit may sense a difference in water pressure and decrease the volumetric flow rate of the hot water proportionately, thereby maintaining the mixed output at a constant temperature.

Federal, state, and municipal regulations, as well as consumer demand, are encouraging the use of plumbing fixtures that use less water. Thus, there is a need for an improved pressure balance unit that can operate effectively under low-flow conditions.

SUMMARY

One implementation of the present disclosure is a pressure balance unit for a valve assembly. The pressure balance unit may include a first shell having a tongue extending therefrom, a second shell having a groove indented therein, and a sliding element having a shaft defining an axis. The first shell may define a first bore and the second shell may define a second bore. The sliding element may include a first end movable along the axis within the first bore. and a second end movable along the axis within the second bore. The groove in the second shell may be configured to receive the tongue from the first shell and the first bore and the second bore may be coaxially aligned when the tongue is received in the groove. In some embodiments, the tongue and groove are substantially semicircular.

In some embodiments, the second shell further includes a second tongue and the first shell further includes a second groove. The second groove may be configured to receive the second tongue. In some embodiments, the first shell and the second shell are interchangeable.

In some embodiments, the sliding element further includes a circular disc extending radially outward from a central portion of the shaft and a diaphragm bonded to the circular disc and extending radially outward from the disc. The diaphragm may form a barrier between the first shell and the second shell and may be overmolded onto the circular disc. In some embodiments, sliding element further includes a metallic sleeve on each end of the shaft.

Another implementation of the pressure balance includes a first shell having a first surface, a second shell having a second surface configured to unite with the first surface, and a sliding element having a shaft defining an axis. The first shell may define a first bore and the second shell may define a second bore. The sliding element may include a first end movable along the axis within the first bore and a second end movable along the axis within the second bore. The first surface and the second surface may be united to form a sealed perimeter of the pressure balancing unit and the first bore and the second bore may be coaxially aligned when the first surface and second surface are united. In some embodiments, the first surface is welded to the second surface to form the sealed perimeter using and, in some embodiments, the welding is sonic welding.

In some embodiments, the sliding element further includes a circular disc extending radially outward from a central portion of the shaft and the pressure balance further includes a diaphragm bonded to the circular disc and extending radially outward from the disc. The diaphragm may form a barrier between the first shell and the second shell and may be overmolded onto the circular disc.

Another implementation of the pressure balance unit includes a first shell defining a first bore, a second shell defining a second bore, and a sliding element having a shaft defining an axis, a first end movable along the axis within the first bore, and a second end movable along the axis within the second bore. In some embodiments, neither the first end nor the second end is a poppet. The sliding element may further include a metallic sleeve on each end of the shaft. The second bore may be axially aligned with the first bore. In some embodiments, the first shell may include a first inlet port in a longitudinal face of the first bore and the second shell may include a second inlet port in a longitudinal face of the second bore. The first inlet port and second inlet port may define openings transverse to the axis.

In some embodiments, first bore and second bore are substantially cylindrical and the first inlet port and the second inlet port are disposed in the circumferential faces of the first bore and second bore respectively. In some embodiments, the first end and the second end of the sliding element are substantially cylindrical, each end cylinder having a longitudinal axis aligned with the axis defined by the shaft.

In some embodiments, sliding element is movable along the axis between a first position in which a circumferential face of the first end cylinder covers the first inlet port and a second position in which a circumferential face of the second end cylinder covers the second inlet port. The sliding element may be configured to move between the first position and the second position in response to a difference in pressure between the first shell and the second shell.

In some embodiments, the sliding element further includes a circular disc extending radially outward from a central portion of the shaft and the pressure balance unit further includes a diaphragm bonded to the circular disc and extending radially outward from the disc. The diaphragm may form a barrier between the first shell and the second shell and may be overmolded onto the circular disc.

DETAILED DESCRIPTION

Figure 1:
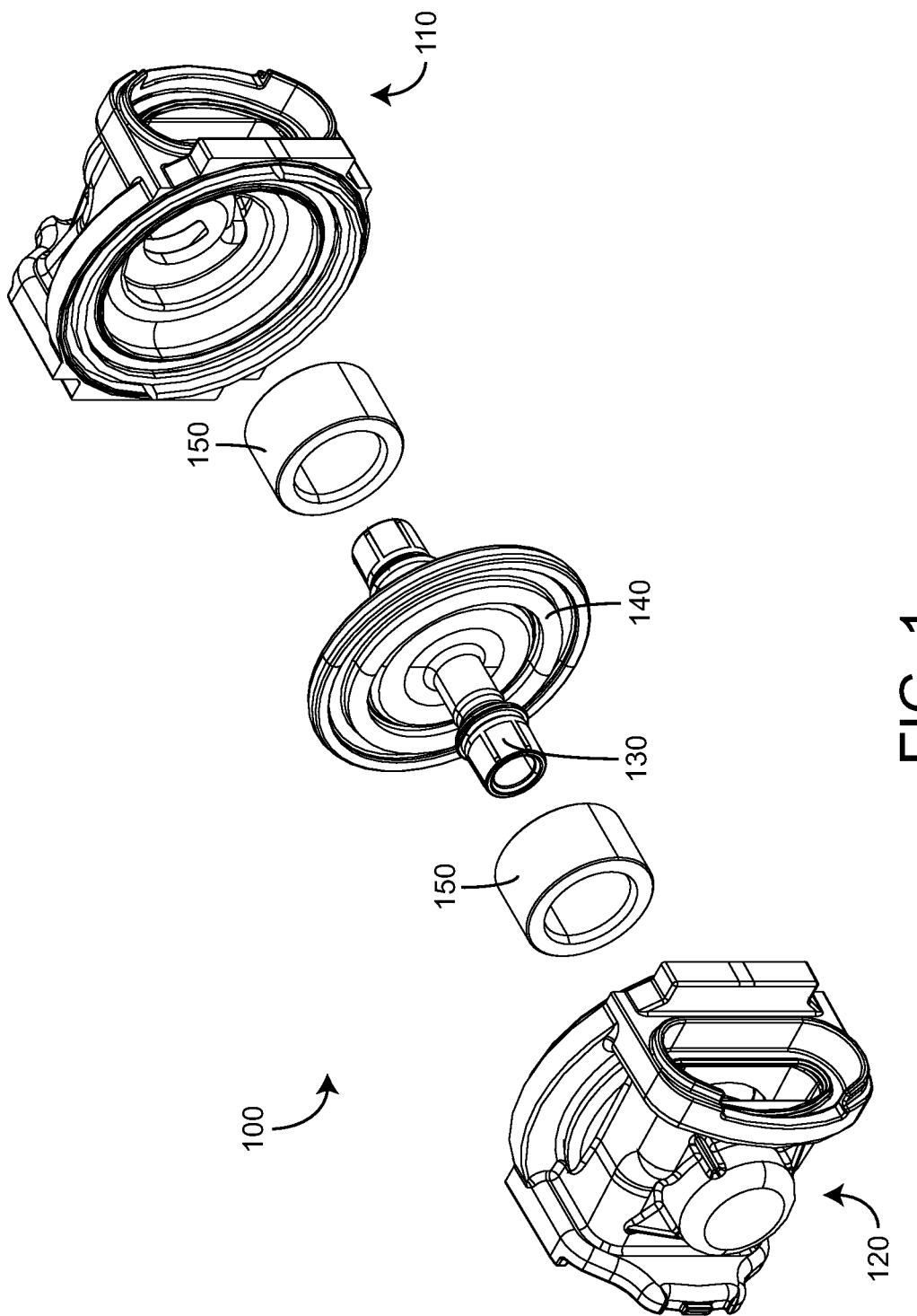
FIG. 1 is an exploded view of a pressure balance unit including a first shell, a second shell, a sliding element, a diaphragm, and sleeves, according to an exemplary embodiment.

Referring to FIG. 1, an exploded view of a pressure balance unit 100 is shown, according to an exemplary embodiment. In brief overview, pressure balance unit 100 may include a first shell 110, a second shell 120, a sliding element 130, a diaphragm 140 extending from a center portion of sliding element 130, and sleeves 150 inserted over the ends of sliding element 130. First shell 110 and second shell 120 may be aligned using a tongue-and-groove alignment system and united (e.g., connected, linked, attached, joined, welded, etc.) to form a cohesive unit. Sliding element 130 may be positioned within shells 110,120 and may be movable along a longitudinal axis defined by a shaft of sliding element 130. Diaphragm 140 may be overmolded onto sliding element 130 and secured inside shells 110,120 along an outer perimeter of diaphragm 140. Diaphragm 140 may form a flexible and pressure-sensitive barrier between shells 110,120. Components 110-150 are described in greater detail in reference to FIGS. 2-7.

In operation, pressure balance unit 100 may receive fluid from separate fluid supply lines (e.g., hot and cold water supply lines within a plumbing system). A first fluid (e.g., hot water) may enter first shell 110 via a first inlet passage and a second fluid (e.g., cold water) may enter second shell 120 via a second inlet passage. Diaphragm 140 may separate a first pressure chamber in the first shell from a second pressure chamber in the second shell. Diaphragm 140 may form a watertight barrier, thereby preventing cross-flow between fluid channels. Due to the flexibility of diaphragm 140, a difference in pressure between shells 110,120 may cause diaphragm 140 to expand, bulge, or otherwise deflect into the shell having the lower pressure. This deflection may cause sliding element 130 to slide over an inlet port fluidly connected to the pressure chamber having the higher pressure, thereby reducing the volumetric flow rate of the high-pressure fluid, and uncover a water inlet to the pressure chamber housing a lower pressure therein, thereby facilitating flow of the low pressure fluid.

Figure 2A:
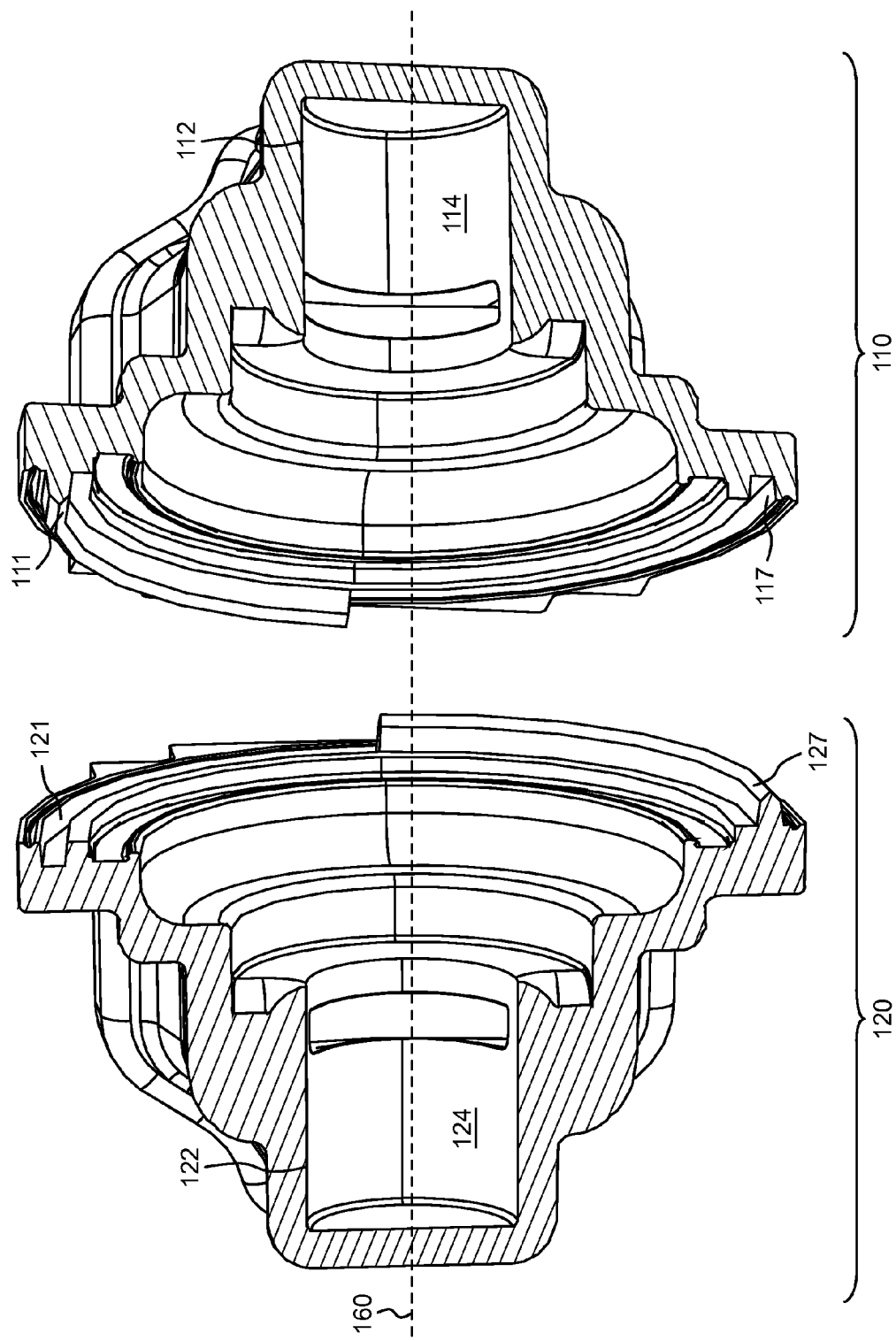
FIG. 2A is a half-sectional view of the first shell and the second shell showing a tongue-in-groove alignment feature, according to an exemplary embodiment.
Figure 2B:
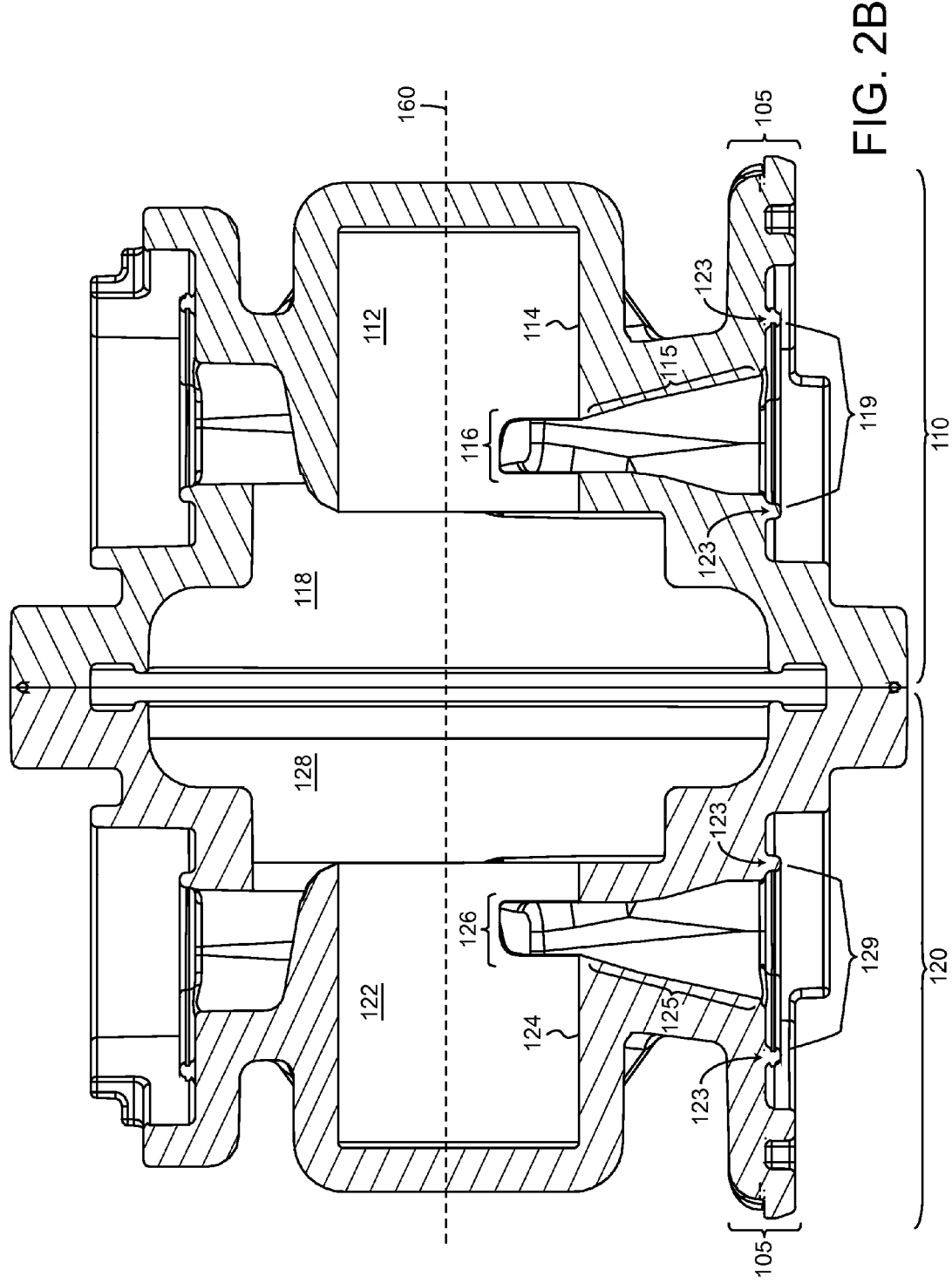
FIG. 2B is another half-sectional view of the first shell and the second shell showing inlet and outlet ports, according to an exemplary embodiment.

Referring now to FIGS. 2A and 2B, half-sectional views of first shell 110 and second shell 120 are shown, according to an exemplary embodiment. In some embodiments, shells 110, 120 may be injection molded using a polymeric material such as Noryl, polyphenylene oxide (PPO), polystyrene (PS), acrylonitrile butadiene styrene (ABS), or any suitable polymer or polymer blend. In other embodiments, shells 110,120 may be formed using any other molding, casting, machining, or sculpting process. In further embodiments, shells 110,120 may be constructed from other materials including metals, ceramics, or any other suitable material. Advantageously, the material for shells 110,120 may be selected to ensure durability and reliability over a range of temperatures and conditions to which system 100 may be subjected.

Referring specifically to FIG. 2A, shells 110,120 may include bores 112,122 defined by an inner surface of each shell. Bores 112,122 may be cavities, recesses, wells, chambers, or other volumes within shells 110,120. In some embodiments, bores 112,122 may be substantially cylindrical having curved circumferential faces 114,124. In other embodiments, to improve manufacturability, bores 112,122 may narrow slightly as bores 112,122 extend into shells 110, 120. A longitudinal axis of bores 112,122 may be aligned with a central axis 160. Bores 112,122 may be configured to receive an end of sliding element 130 (e.g., a first end of sliding element 130 may fit within bore 112 and a second end of sliding element 130 may fit within bore 122.). Bores 112, 122 may provide volumes within which the ends of sliding element 130 may move (e.g., longitudinally along axis 160).

Still referring to FIG. 2A, shells 110,120 may include one or more alignment features. For example, shell 110 may include a tongue 111 (e.g., tongue portion) extending therefrom and shell 120 may include a groove 121 (e.g., grove portion) indented therein. Groove 121 may be configured to receive tongue 111 when shells 110,120 are aligned, thereby facilitating assembly of shells 110,120 into a cohesive unit. According to the exemplary embodiment, when shells 110, 120 are aligned, the longitudinal axes of bores 112,122 align with central axis 160. In some embodiments, tongue 111 and groove 121 may extend partly or less than completely around the axis 160. For example, tongue 111 and grove 121 may be substantially semi-circular (e.g., extending approximately 180 degrees in an arc around the perimeter of a circular opening in shells 110,120), quarter circular, etc.

In some embodiments, shells 110 and 120 may be interchangeable (e.g., identical, functionally equivalent components, etc.). For interchangeability, shell 110 may further include a groove 117 indented therein and shell 120 may further include a tongue 127 extending therefrom. Groove 117 may be configured to receive tongue 127 when shells 110,120 are aligned. Advantageously, interchangeability between shells 110,120 may facilitate assembly and reduce manufacturing costs. For example, interchangeable shells may allow one shell design to be manufactured rather than two different shell designs. During assembly, two interchangeable shells may be selected. One of the shells may be rotated 180° and aligned with the other shell. Such interchangeability may reduce production costs and reduce assembly errors.

Referring now to FIG. 2B, shells 110,120 may be united to form a sealed perimeter of the pressure balance unit 110. In some embodiments, shells 110,120 may be joined using an ultrasonic welding process. For example, shells 110,120 may be positioned between a fixed shape nest and a sonotrode (e.g., a tool that creates ultrasonic vibrations) connected to a transducer. The sonotrode may emit an acoustic vibrational energy which is absorbed by shells 110,120. The absorbed vibrational energy may melt a point or surface of contact between shells 110,120, thereby creating a joint between shells. Welding of the shells may provide a sealed unit that helps prevent fluid from leaking out of, or debris from entering into, the pressure balance unit. In other embodiments, shells 110,120 may be joined using any other process, method, or technique including the use of adhesive compounds, screws, bolts, snap-fit designs, etc. When shells 110, 112 are united, bores 112,122 may be coaxially aligned.

Still referring to FIG. 2B, shells 110,120 may further include inlet ports 116 and 126 defining openings within each shell. Ports 116,126 may be positioned in circumferential faces 114,124 of bores 112,122 and may allow fluid to enter bores 112,122 in a direction perpendicular to axis 160. Ports 116,126 may be openings, slots, holes, gaps, channels, or any other means by which fluid may enter bores 112,122.

Shells 110, 120 may further include passages 115 and 125. Passages 115,125 may be tubes, guides, channels, paths, surfaces, or other elements for directing or fluid flow. Passages 115,125 may fluidly connect ports 116,126 with external openings 119,129 through which fluid may enter each shell. At one end of passages 115,125 (e.g., the downstream end), ports 116,126 may connect passages 115,125 with bores 112, 122. At the other end of passages 115,125 (e.g., the upstream end), seals 113,123 may be formed around perimeter openings 119,129. Seals 113,123 may form fluid barriers between shells 110,120 and a volume control plate.

In some embodiments, seals 113,123 may allow rotation of pressure balance unit 110 relative to a volume control plate (e.g., pressure balance unit 110 may rotate, the volume control plate may rotate, both may rotate at different rates, or in different directions, etc.). In other embodiments, the volume control plate may be stationary relative to pressure balance unit 100. For example, neither component may rotate or both may rotate at the same rate and in the same direction.

In some embodiments, shells 110,120 may include a mechanism 105 for coupling the volume control plate to pressure balance unit 100. The coupling mechanism may include a groove, slot, indentation, channel, snap, peg, extrusion, fitting, fastener, or other connecting feature. Pressure balance unit 100 may be coupled to the volume control plate rotatably (e.g., the connection between pressure balance unit 100 and volume control plate may allow rotation between components), releasably (e.g., components may be separated and reconnected), or permanently (e.g., using an adhesive compound, welding, or other permanent or semi-permanent connection means).

Still referring to FIG. 2B, shells 110,120 may further include pressure chambers 118,128 fluidly connected to bores 112,122. Pressure chambers 118,128 may define volumes within shells 110,120 in which pressure balance unit 100 may attempt to equalize fluid pressure. Pressure chambers 118,128 may be fluidly connected with bores 112,122.

Advantageously, once fluid has entered bores 112,122, the fluid may flow into pressure chambers 118,128 without potentially being obstructed by another component within shells 110,120. For example, fluid contained within bores 112,122 may enter pressure chambers 118,128 regardless of the position of sliding element 130. This fluid connectivity, among other features, distinguishes pressure balance unit 100 from traditional pressure balance units which typically open and close a port between a bore and a pressure chamber.

Conventional pressure balance units may use a diaphragm or shuttle to react to an imbalance in water pressure. Some diaphragm units may use a poppet to open and close a port, for example by having a poppet positioned in the hot water flow path and a poppet positioned in the cold water flow path. The poppet valve may open and close a port by lifting and lowering the poppet from the seat of the port (e.g., in a direction parallel to the port opening). A poppet is fundamentally different from a slide valve or oscillating valve. Instead of sliding over a seal to uncover a port, a poppet valve lifts from the seat with a movement perpendicular to the port.

Advantageously, pressure balance unit 100 may restrict fluid flow by variably opening and closing inlet ports 116,126 by sliding an end of sliding element 130 or sleeve 150 couple thereto across ports 116,126 (e.g., in a direction transverse to the port opening). This feature differentiates pressure balance unit 100 from conventional pressure balance units which lift and lower a poppet-style seal in a direction parallel to the port opening. Sliding across the ports instead of lifting from the ports may provide improved flow restriction control and accuracy, making the valve more suitable for low-flow conditions. Sliding across the port instead of lifting from the port may improve the durability of pressure balance unit 100 by eliminating the wear of the poppet seating and reseating.

Figure 3:
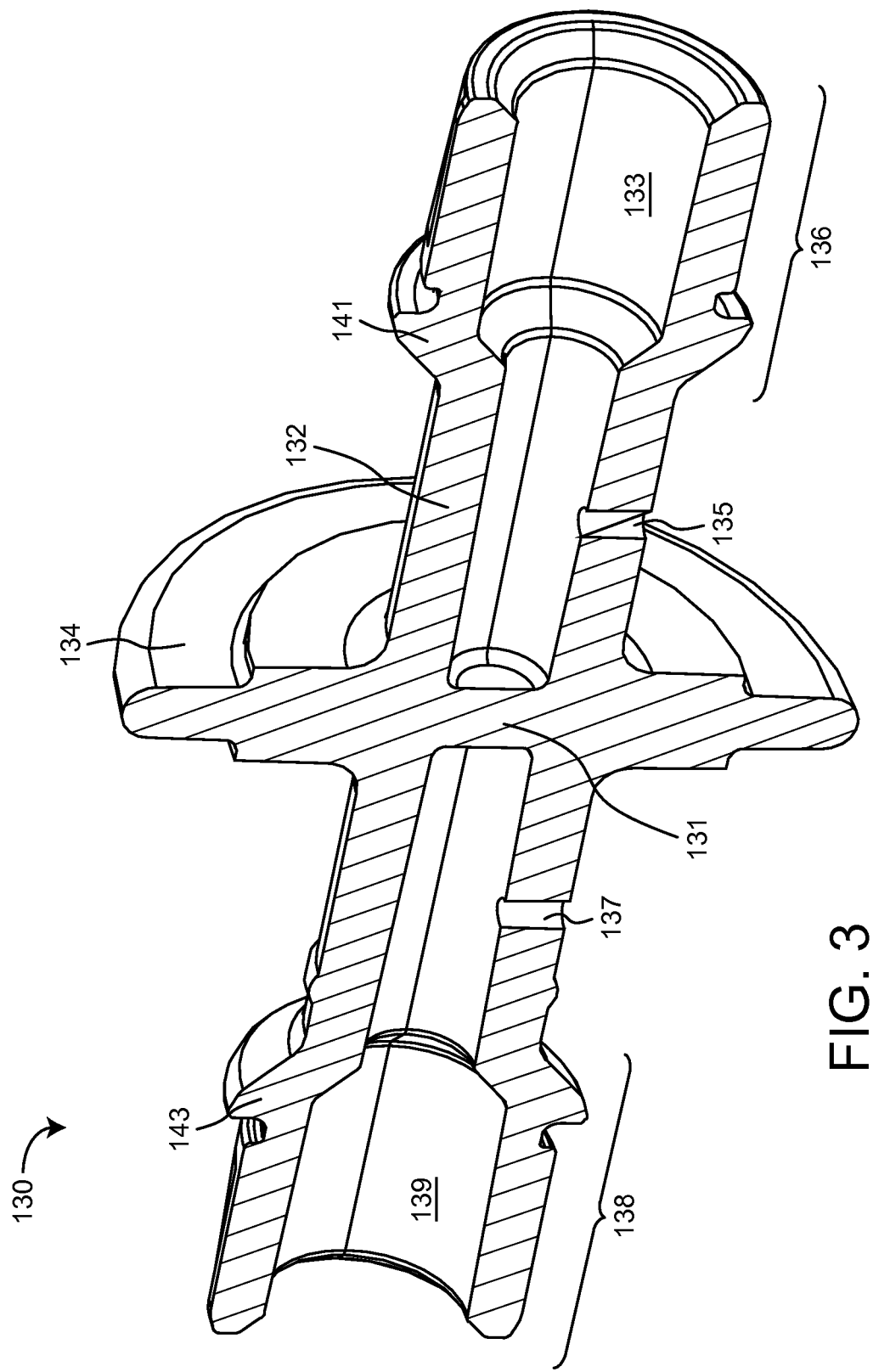
FIG. 3 is a half-sectional view of the sliding element, according to an exemplary embodiment.

Referring now to FIG. 3, a half-sectional view of sliding element 130 is shown, according to an exemplary embodiment. Sliding element 130 may include a central shaft 132, a circular disc 134 extending radially from shaft 132, a first end 136, and a second end 138. Sliding element 130 may be positioned within shells 110,120 with end 136 located in bore 112 and end 138 located in bore 122. In some embodiments, shaft 132, disc 134, and ends 136,138 may be injection molded from a polymeric material and may form a single molded part (e.g., the injection molding process may form a single rigid part comprising shaft 132, disc 134, and ends 136,138). In other embodiments, sliding element 130 may be made of metals (e.g., brass, stainless steel, etc.), ceramics, other plastics, or any other suitable material. Sliding element 130 may be a rigid component such that movement of one part of sliding element 130 causes movement of all other parts with minimal flexibility (e.g., expansion, compression, bending, material strain, etc.).

Shaft 132 may connect ends 136,138. In some embodiments, shaft 132 may be substantially hollow except for a thin dividing wall 131 located at a midpoint of the shaft. The thickness of shaft 132 may be chosen to maintain rigidity while reducing material cost and weight. In some embodiments, the hollow core within shaft 132 may be large relative to an overall diameter of the shaft. In other words, shaft 132 may be a thin shell around a relatively large hollow core. Dividing wall 131 may separate a first half 133 of the hollow core from a second half 139 of the hollow core. Ends 136,138 may be open such that fluid within bore 112 may enter hollow core half 133 and fluid within bore 122 may enter hollow core half 139.

In some embodiments, shaft 132 may include holes 135, 137 extending radially from hollow core halves 133,139 respectively. Hole 135 may form a fluid connection between hollow core half 133 and pressure chamber 118 and hole 137 may form a fluid connection between hollow core half 139 and pressure chamber 128. Holes 135,137 may fluidly connect, and therefore balance pressures between, bore 112 with pressure chamber 118 and bore 122 with pressure chamber 128 when sliding element 130 is positioned within bores 112,122. For example, as sliding element 130 slides along axis 160, the open volumes within bores 112,122 may increase or decrease. Fluid within bores 112,122 may enter hollow core halves 133,139 and flow into pressure chambers 118,128 via holes 135,137. Conversely, fluid within pressure chambers 118,128 may enter hollow core halves 133,139 via holes 135,137. Advantageously, the fluid connections between bores 112,122 and pressure chambers 118,128 may allow sliding element 130 to have an increased responsiveness to pressure differences between pressure chambers 118, 128, prevent fluid from becoming trapped within bores 112, 122, and prevent a low pressure condition in bore 112,122 from inhibiting motion of the sliding element 130.

Still referring to FIG. 3, sliding element 130 may include a circular disc 134 extending radially from a midpoint of shaft 132. Disc 134 may extend radially outward from an outer surface of shaft 132 or may extend through shaft 132, thereby forming dividing wall 131 separating hollow core halves 133,139. Disc 134 may be injection molded along with shaft 132 and ends 136,138 as part of a single molding process, forming a unitary part including shaft 132, disc 134, and ends 136,138.

Still referring to FIG. 3, sliding element 130 may include a first end 136 and a second end 138. Ends 136,138 may define a first end and a second end of sliding element 130 between which shaft 132 extends. In some embodiments, ends 136, 138 may be substantially cylindrical, having cylindrical radii larger than the radius of shaft 132. In other embodiments, ends 136,138 may be indistinguishable from shaft 132 or may have smaller cylindrical radii than shaft 132. Ends 136,138 may include rings 141,143 extending radially from shaft 132. Rings 141,143 may define an end position for sleeves 150 when placed over ends 136,138, described in greater detail in reference to FIG. 7. Ends 136,138 may include one or more ribs configured to retain sleeves 150 via press-fit.

Figure 4:
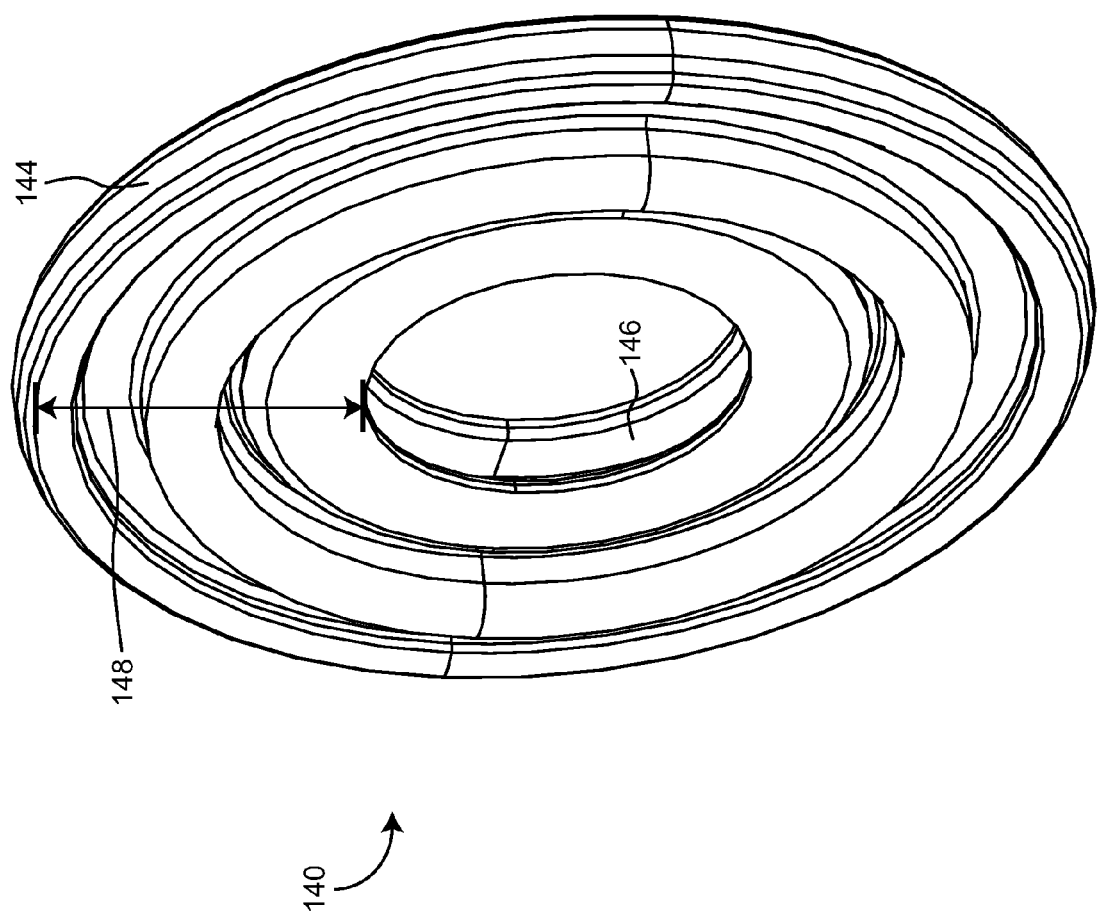
FIG. 4 is a perspective view of the diaphragm, according to an exemplary embodiment.

Referring now to FIG. 4, a perspective view of diaphragm 140 is shown, according to an exemplary embodiment. Diaphragm 140 may include an outer rim 144, an inner rim 146, and a flexible portion 148 extending radially therebetween. Diaphragm 140 may be a flexible component made of rubber or any other suitable material. Outer rim 144 may securely attach to shells 110,120. For example, outer rim 144 may fit within a groove between shells 110,120, thereby securing diaphragm 140 along outer rim 144 as shells 110,120 are joined together. In other embodiments, outer rim 144 may be fastened, adhered, bonded, or otherwise secured to an inner surface of shell 110, shell 120, or between shells 110,120 using any other fastening method or configuration.

Still referring to FIG. 4, flexible portion 148 may extend radially outward from inner rim 148 to outer rim 146. Flexible portion 148 may be "S-shaped" to allow inner rim 148 to move in either direction (e.g., in a direction parallel to shaft 132) as sliding element 130 moves along axis 160. In other embodiments, flexible portion 148 may be fluted, C-shaped, or have any other shape. Flexible portion 148 may define a pressure-sensitive surface responsive to differences in fluid pressure between pressure chambers 118,128. For example, if the fluid pressure in pressure chamber 118 exceeds the fluid pressure in pressure chamber 128, flexible portion 148 may expand, stretch, bulge, or otherwise deflect into pressure chamber 128. Likewise, if the fluid pressure in pressure chamber 128 exceeds the fluid pressure in pressure chamber 118, flexible portion 148 may expand into pressure chamber 118.

Figure 5:
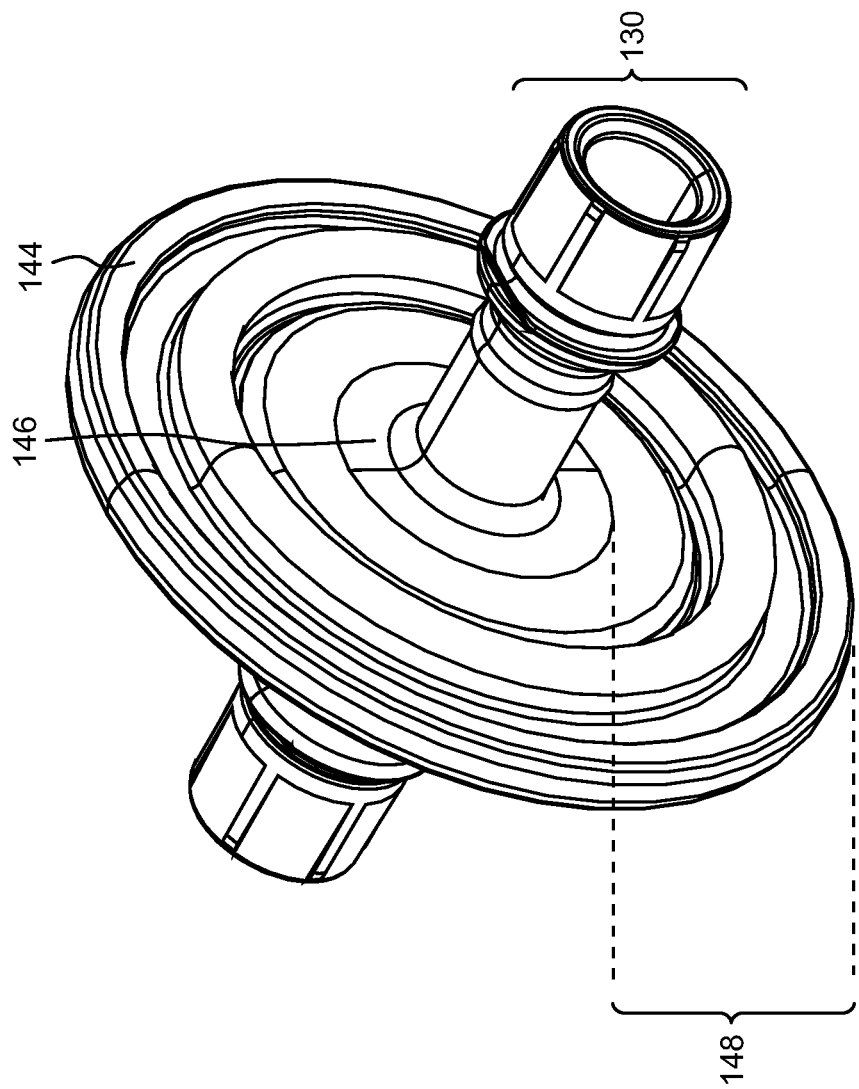
FIG. 5 is a perspective view of the diaphragm extending radially from the sliding element, according to an exemplary embodiment.
Figure 6:
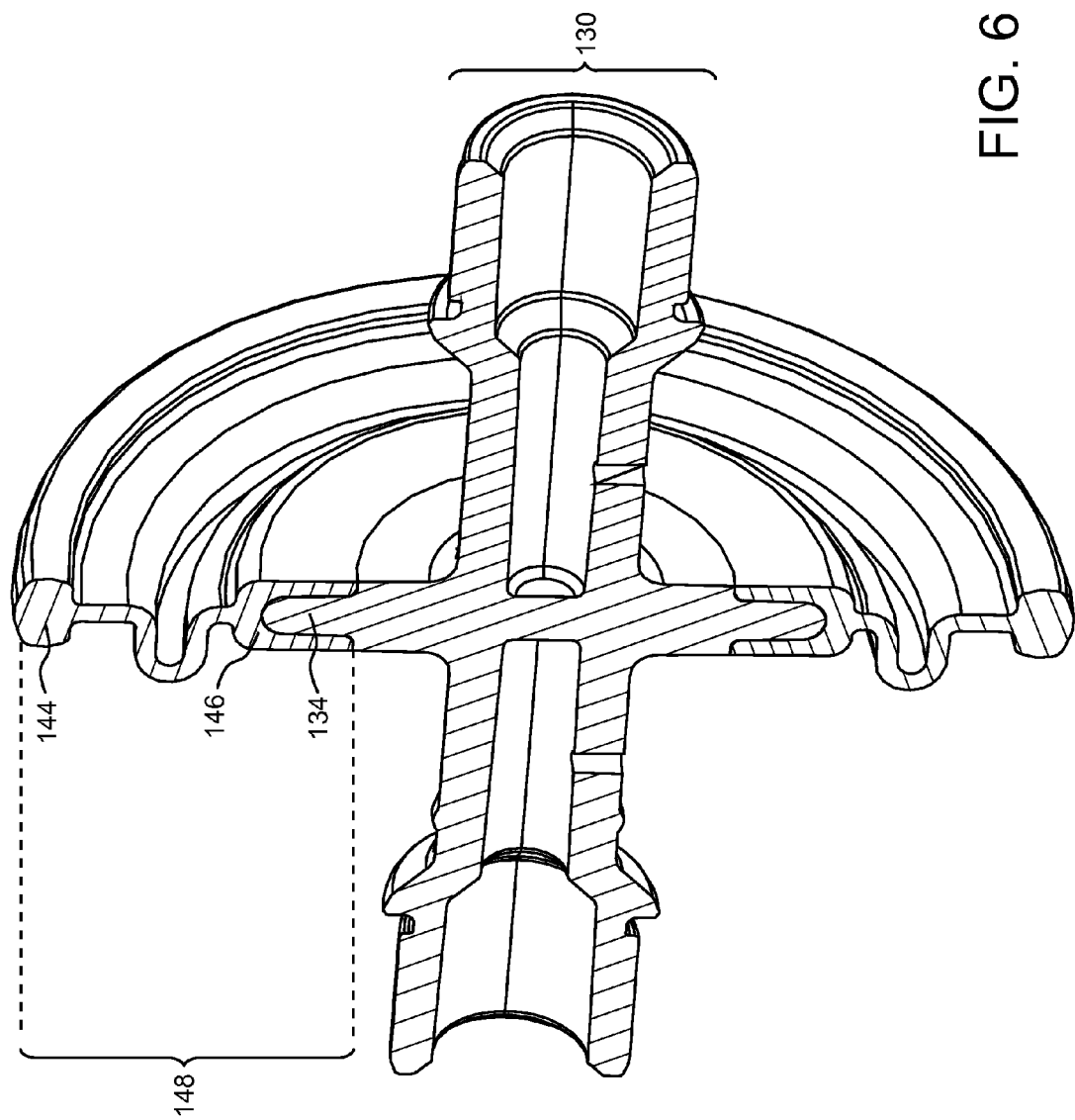
FIG. 6 is a half-sectional view of the diaphragm overmolded onto the sliding element, according to an exemplary embodiment.

Referring now to FIG. 5 and FIG. 6, inner rim 146 may be secured to sliding element 130. For example, diaphragm 140 may be overmolded onto sliding element 130 such that inner rim 146 surrounds a narrower outer portion of circular disc 134 that extends from a wider inner portion of disc 134. Diaphragm 140 may be bonded to sliding element 130 (e.g., overmolded, secured via an adhesive, fastened, attached, secured, etc.) in a complete circle around sliding element 130, thereby forming a seal between pressure chambers 118,128 and preventing cross-flow between fluid channels.

Figure 7:
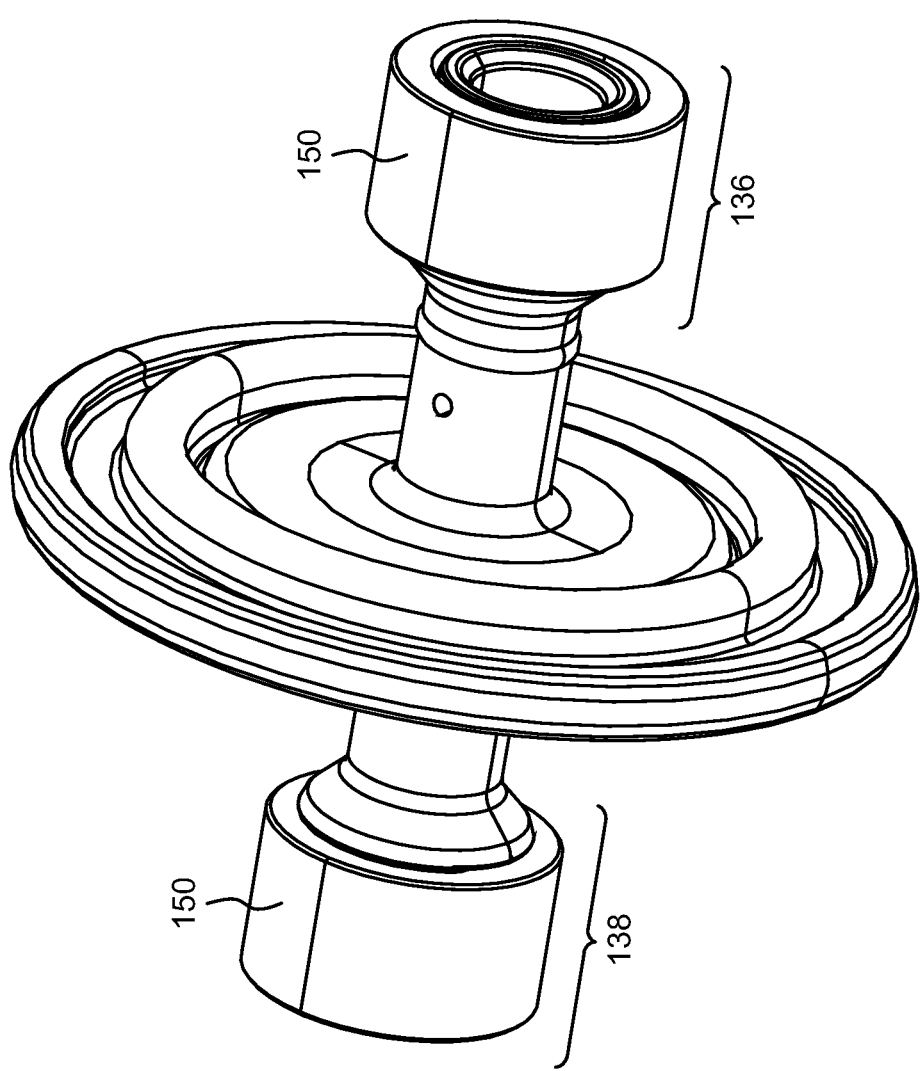
FIG. 7 is a perspective view of the sleeves inserted over the ends of the sliding element, according to an exemplary embodiment.

Referring now to FIG. 7, sleeves 150 may be fitted over ends 136,138. Sleeves 150 may have an interior surface designed to align with the outer surface of ends 136,138 and an exterior surface designed to align with the inner surface of bores 112,122. Sleeves 150 may surround ends 136,138 and allow ends 136,138 to move more easily (e.g., with less drag, less friction, and reduced wear) within bores 112,122. Advantageously, sleeves 150 may improve the alignment between ends 136,138 and bores 112,122. Sleeves 150 may slide across inlet ports 116,126, thereby opening or closing ports 116,126 in response to differences in pressure between pressure chambers 118,128. Advantageously, sleeves 150 allow ports 116,126 to be opened or closed incrementally by sliding partially over an open port. Incremental port opening and closing may provide improved flow restriction control over conventional poppet-style units and may improve the effectiveness of pressure balance unit 100. Advantageously, the tolerances of sleeves 150 may be tightly controlled to provide a desired interface with bores 112,122, thus reducing leakage thereby and enabling use of the pressure balance unit in low-flow conditions.

In an exemplary embodiment, sleeves 150 may be made of stainless steel. In other embodiments, sleeves 150 may be made of any other suitable material (e.g., polymers, other metals, ceramics, etc.). Advantageously, sleeves 150 may reduce friction, improve alignment, increase durability, reduce leakage, or otherwise facilitate operation of pressure balance unit 100. Sleeves 150 may be pressed (e.g., pressure fitted) onto ends 136,138 or may be attached, adhered, or otherwise secured using any other fastening mechanism. Sleeves 150 may rest against rings 141,143 extending from shaft 132 when seated on ends 136,138.

Figure 8:
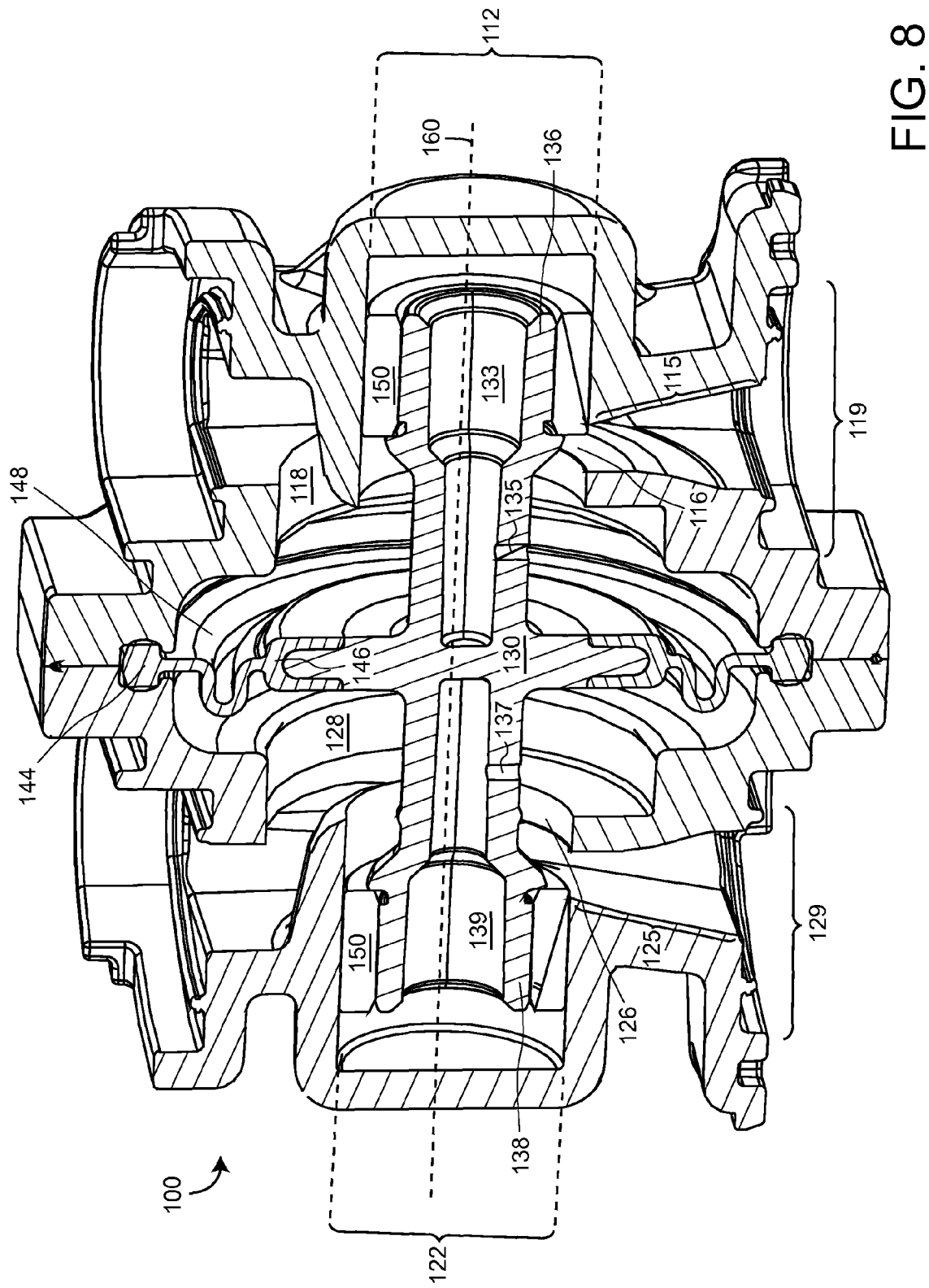
FIG. 8 is a half-sectional view of an assembled pressure balance unit, according to an exemplary embodiment.

Referring now to FIG. 8, a half-sectional view of an assembled pressure balance unit 100 is shown, according to an exemplary embodiment. In operation, a first fluid may enter the pressure balance unit via opening 119 and flow through inlet passage 115 and inlet port 116 into bore 112. The first fluid may further enter pressure chamber 118 and contact diaphragm 140. Similarly, the second fluid may enter the pressure balance unit via opening 129 and flow through inlet passage 125 and inlet port 126 into bore 122. The second fluid may further enter pressure chamber 128 and contact diaphragm 140.

Flexible portion 148 of diaphragm 140 may respond to a difference in pressure between pressure chambers 118,128 by expanding, flexing, bending, or otherwise moving toward the pressure chamber with the lower fluid pressure. Inner rim 146 may move along with flexible portion 148, thereby causing sliding element 130 to move along axis 160. For example, if the fluid pressure in pressure chamber 118 exceeds the fluid pressure in pressure chamber 128, sliding element 130 may slide along axis 160 toward shell 120. Consequently, end 136 and a sleeve 150 covering end 136 may slide over inlet port 116, thereby at least partly closing port 116 and restricting fluid flow into bore 112.

As sliding element 130 moves along axis 160 toward shell 120, the volume between end 138 and the circular end of bore 122 may decrease, thereby causing the second fluid to flow into hollow half 139 and through hole 137 into pressure chamber 128. Similarly, the volume between end 136 and the circular end of bore 112 may increase, thereby causing the first fluid to flow from pressure chamber 118 through hole 135, hollow half 133, and into bore 112. As pressure equalizes between pressure chambers 118,128, sliding element 130 may move back into a neutral position, thereby reopening inlet port 116.

In some embodiments, pressure balance unit 100 may include a thermostatic component. The thermostatic component may provide for temperature regulation in addition to pressure balancing functionality. The thermostatic component may be an additional component inserted in series with the aforementioned components of pressure balance unit 100 or may be integrated into the previously described components. For example, sliding element 130 and/or diaphragm 140 may be biased toward one of pressure chambers 118,128 based on the temperature of the first or second fluid. As the fluid temperature changes, the thermostatic component may alter the bias of sliding element 130 and/or diaphragm 140 (e.g., the thermostatic offset), thereby increasing or decreasing an amount of inlet ports 116,126 through which the fluids are permitted to flow. In some embodiments, pressure balance unit 100 may be a combination pressure balance and temperature balance (e.g., thermostatic) unit.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A pressure balance unit for a valve assembly, the pressure balance unit comprising:
    a first shell having a tongue extending therefrom, wherein the first shell defines a first bore;
    a second shell having a groove indented therein, wherein the second shell defines a second bore;
    a sliding element having a shaft defining an axis and including a separating wall dividing a first hollow core and a second hollow core, a first end movable along the axis within the first bore, and a second end movable along the axis within the second bore, wherein the shaft also includes a first hole, which extends radially relative to the axis and fluidly connects the first hollow core and a first pressure chamber, and a second hole, which extends radially relative to the axis and fluidly connects the second hollow core and a second pressure chamber; and
    a sleeve provided over at least one of the first end and the second end of the sliding element,
    wherein the groove in the second shell is configured to receive the tongue from the first shell and wherein the first bore and the second bore are coaxially aligned when the tongue is received in the groove.

2. The pressure balance unit of claim 1, wherein the tongue and groove are substantially semicircular.

3. The pressure balance unit of claim 1, wherein the second shell further includes a second tongue and the first shell further includes a second groove, wherein the second groove is configured to receive the second tongue.

4. The pressure balance unit of claim 1, wherein the first end of the sliding element includes a first sleeve provided thereon, and wherein the second end of the sliding element includes a second sleeve provided thereon.

5. The pressure balance unit of claim 1, wherein the sliding element further includes a circular disc extending radially outward from a central portion of the shaft.

6. The pressure balance unit of claim 5, further comprising a diaphragm bonded to the circular disc and extending radially outward from the disc, wherein the diaphragm forms a barrier between the first shell and the second shell and has a C-shaped cross-section in a flexible portion.

7. A pressure balance unit for a valve assembly, the pressure balance unit comprising:
    a first shell having a first surface, wherein the first shell defines a first bore;
    a second shell having a second surface configured to unite with the first surface, wherein the second shell defines a second bore;
    a sliding element having a shaft having a hollow core and defining an axis, a first end movable along the axis within the first bore, and a second end movable along the axis within the second bore, wherein the shaft also includes a radially extending hole that fluidly connects the hollow core and a pressure chamber; and
    a sleeve surrounding at least one of the first and second ends of the sliding element,
    wherein the first surface and the second surface are united to form a sealed perimeter of the pressure balancing unit and wherein the first bore and the second bore are coaxially aligned when the first surface and second surface are united.

8. The pressure balance unit of claim 7, wherein the first surface is united with the second surface to form the sealed perimeter using an adhesive compound or a welding process.

9. The pressure balance unit of claim 7, wherein the first end of the sliding element is surrounded by a first sleeve, and wherein the second end of the sliding element is surrounded by a second sleeve.

10. The pressure balance unit of claim 7, wherein the sliding element further includes a circular disc extending radially outward from a central portion of the shaft.

11. The pressure balance unit of claim 10, further comprising a diaphragm bonded to the circular disc and extending radially outward from the disc, wherein the diaphragm forms a barrier between the first shell and the second shell.

12. The pressure balance unit of claim 11, wherein the diaphragm is overmolded onto the circular disc.

13. A pressure balance unit for a valve assembly, the pressure balance unit comprising:
    a first shell defining a first bore and including a first inlet port in a longitudinal face of the first bore;
    a second shell defining a second bore and including a second inlet port in a longitudinal face of the second bore, wherein the second bore is axially aligned with the first bore; and
    a sliding element having a hollow core shaft defining an axis, a first end movable along the axis within the first bore, and a second end movable along the axis within the second bore, wherein a radially extending hole fluidly connects the hollow core and a pressure chamber;
    wherein the first inlet port and second inlet port define openings transverse to the axis, wherein the first end and the second end of the sliding element are substantially cylindrical, each end cylinder having a longitudinal axis aligned with the axis defined by the shaft, and wherein the sliding element further includes a sleeve on each end of the shaft.

14. The pressure balance unit of claim 13, wherein the sliding element opens and closes the inlet ports by sliding across faces of the ports, wherein the first end slides across the first inlet port and the second end slides across the second inlet port.

15. The pressure balance unit of claim 13, wherein the first bore and second bore are substantially cylindrical and the first inlet port and the second inlet port are disposed in the circumferential faces of the first bore and second bore respectively.

16. The pressure balance unit of claim 13, wherein the sliding element is substantially hollow and wherein the shaft includes a first hole fluidly connecting the first bore with the first inlet port and a second hole fluidly connecting the second bore with the second inlet port.

17. The pressure balance unit of claim 13, wherein each sleeve is metallic.

18. The pressure balance unit of claim 13, wherein the sliding element is movable along the axis between a first position in which a circumferential face of the first end cylinder covers the first inlet port and a second position in which a circumferential face of the second end cylinder covers the second inlet port.

19. The pressure balance unit of claim 18, wherein the sliding element is configured to move between the first position and the second position in response to a difference in pressure between the first shell and the second shell.

* * * * *